Nov. 14, 1939. J. F. MAXWELL 2,180,323
FISHING ROD
Filed Aug. 16, 1938
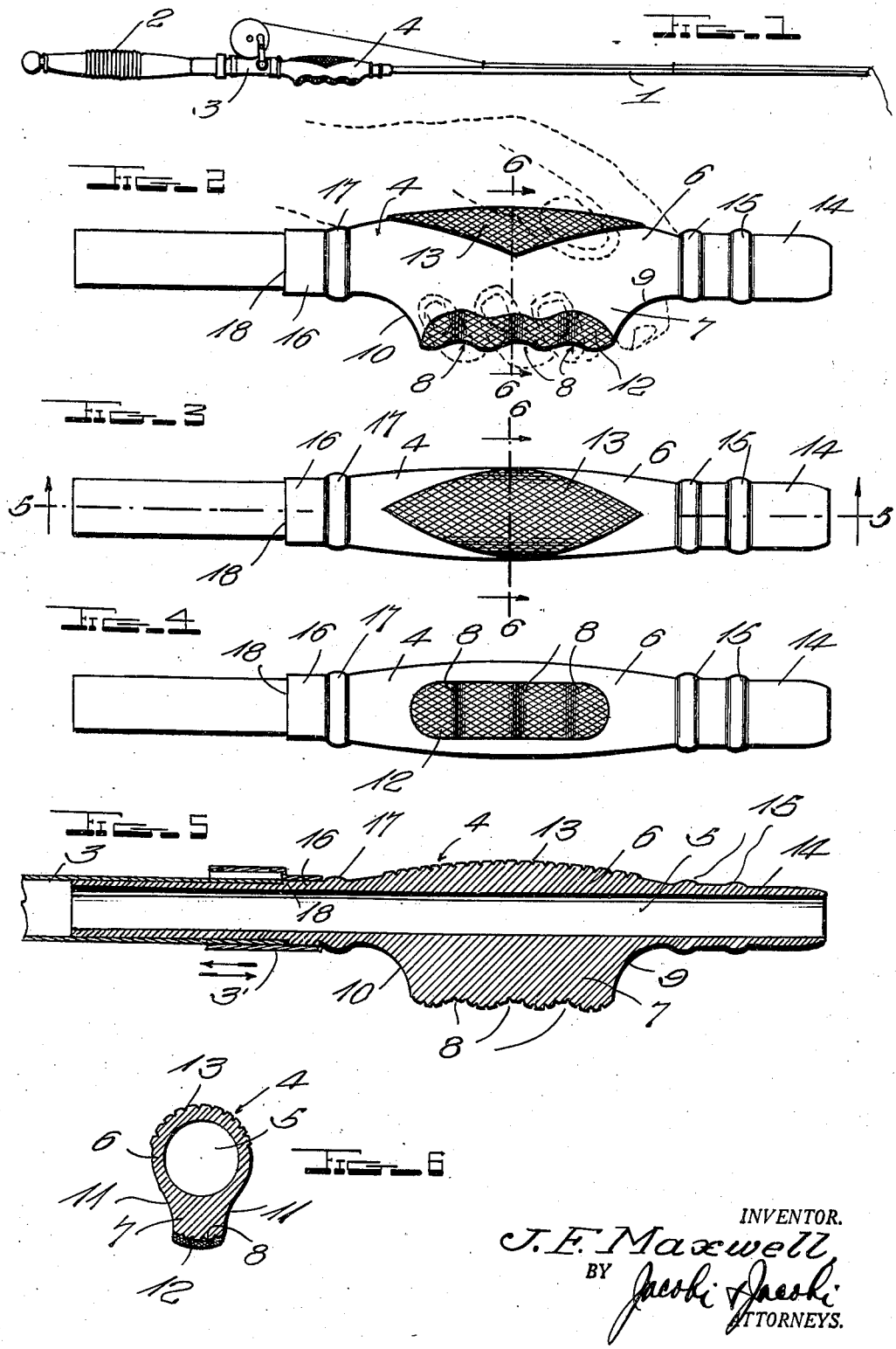
INVENTOR.
J. F. Maxwell
BY Jacobi & Jacobi
ATTORNEYS.

Patented Nov. 14, 1939

2,180,323

UNITED STATES PATENT OFFICE 2,180,323

FISHING ROD

James Farley Maxwell, Chickasaw, Ala.

Application August 16, 1938, Serial No. 225,229

4 Claims. (Cl. 43—23)

This invention relates to fishing rods and more particularly to a forehand grip for use upon fishing rods of the type used for deep sea fishing.

A large amount of strength and endurance is required to hold a rod in the correct position for reeling in a line after hooking a large deep sea game fish. The rod has to be held with one hand in order to leave the other free to manipulate the reel, and when rods as now manufactured are used, they must be tightly gripped with the forehand in order to prevent the rod from being turned in the hand out of the proper position. This requires a great deal of strength and endurance when a round grip is used and when ladies and other persons who do not have very strong hands are fishing, the hand and wrist soon become very tired.

It is, therefore, one object of the invention to provide a forehand grip which may be easily grasped with one hand and the butt of the rod held against a person's body while the forehand grip and the rod are held against turning in a person's hand.

Another object of the invention is to provide a grip which is not bulky and will not cause the rod to be improperly balanced.

Another object of the invention is to provide a grip which will fit the hand of the user and be very comfortable to use, it being further so formed that it will not detract from the appearance of a rod and be undesirable upon an expensive rod.

Another object of the invention is to so form the grip that when it is held in a person's hand the forefinger may engage around the front end of the grip while the other fingers engage in seats provided along the under portion of the grip. The grip may, therefore, not only be easily gripped and prevented from turning in a person's hand, but rearward pull may be exerted and the butt end of the rod held in firm engagement with a person's body while reeling in a fish.

Still another object of the invention resides in providing a device which is simple and durable in construction, inexpensive to manufacture and one which will be very efficient in operation and application to use.

With these and numerous other objects in view, my invention consists in the novel features of construction, combination and arrangement of parts as will be hereinafter referred to and more particularly pointed out in the specification and claims.

The invention is illustrated in the accompanying drawing wherein:

Fig. 1 is a side elevation of a fishing rod equipped with a forehand grip of the improved construction.

Fig. 2 is a side elevation of the grip removed from the rod.

Fig. 3 is a top view of the grip.

Fig. 4 is a bottom view of the grip.

Fig. 5 is a sectional view taken longitudinally through the grip along the line 5—5 of Fig. 3.

Fig. 6 is a sectional view taken transversely through the grip along the line 6—6 of Fig. 2 or Fig. 3.

The fishing rod shown in Fig. 1 and indicated by the numeral 1 is provided with the usual handle 2 and reel seat 3 which are of a conventional formation, and between the reel seat 3 and the rod 1 is disposed the improved forehand grip 4. This grip is of a special construction and permits the rod to be easily held and prevented from turning while reeling in the line after a fish has been hooked. The grip is specifically illustrated in Figures 2 through 6 and referring to these figures, it will be seen that the grip is bored longitudinally as shown at 5 to receive the rear portion of the rod 1 and has body portion 6 which is extended downwardly as shown at 7 to provide a finger-engaging portion having finger receiving recesses 8 in its lower edge face and terminating in spaced relation to the front end of the body to provide a shoulder 9 for engagement by the index finger of the hand which grasps the grip as indicated by dotted lines in Fig. 2. The rear end of the extension 7 is also formed with a shoulder 10 similar in contour to the shoulder 9 and provided in order to impart symmetrical appearance to the grip and thus not detract from its appearance. The under edge face of the extension 7 is rounded transversely as shown in Fig. 6 and the upper portion of the grip is also rounded transversely as shown in this figure in order that the grip may be easily held in a person's hand with the thumb extending across the upper portion of the body and three fingers engaged in the recesses 8, the tips of these fingers being engaged with the concaved side face of the extension 7 and the index finger engaging across the shoulder 9. Both of the side faces of the extension 7 are concaved as shown at 11 with their upper and lower portions merging into rounded sides of the body and the rounded lower edge of the extension 7 and, therefore, the grip when held will conform to the curled fingers and cupped palm of a person's hand. Only a light gripping pressure is, therefore, necessary in order to hold the grip and prevent it from turning in a person's hand. The under face of the grip is roughened as shown at 12 and its upper portion is formed with a slightly protruding roughened portion 13. The fingers and palm of the hand will thus be prevented from slipping upon the grip even when moist by perspiration.

At its forward end, the body 6 of the grip merges into a front shank 14 formed with circumferentially extending reinforcing ribs 15 between which an ornamental thread binding may be provided if so desired. At its rear end, the body 6 also merges into a neck 16 about the forward end of which is formed a circumferentially extending rib 17. This neck or shank 16 is reduced externally from its rear end for the major portion of its length to provide a circumferentially extending shoulder 18, and from an inspection of Fig. 5, it will be seen that when the grip is applied to the reel seat 3 and secured therein by glue, the front end of the seat will abut the shoulder 18 and be overlapped and surrounded by the collar 3' of the seat which fits snugly about the forward portion of the neck and abuts the rib 17.

When a rod equipped with the improved forehand grip is in use, it is assembled as shown in Fig. 1 with the grip 14 disposed between the rod 1 and the reel seat 3. The forward portion of the reel seat fits about the rear neck or shank 16 where it is secured by glue and the rod is snugly received in the bore 5 and may extend partially through the grip or entirely through it if so desired. The rod is held in the usual manner with the knob at the rear end of the handle 2 pressed against a person's body and the forehand grip 4 held with one hand. As the body portion of the grip conforms to the shape of the hand, it may be easily held with light pressure and prevented from turning in the hand. Therefore, when reeling in the line, turning of the rod will be prevented without exerting a tight grip and strain upon the hand and wrist will be eliminated. The fact that the first finger or index finger engages across the shoulder 9 also tends to exert rear pressure and the rear end of the handle will be held firmly against the body of the person using the rod. The reel seat must be securely glued on the shank or neck of the grip for if it were loose on the grip and turn while in use, the purpose of the grip would be defeated. When the rod is ready for use, the grip, reel seat and reel must be held tightly in place and operate as a unit. To dismantle the rod, the handle may be taken off or the pole slipped out of the grip, but the reel seat must be attached fast to the grip at all times. To make a jointed rod, the handle may be left in engagement with the reel seat and the rod or pole slipped out of the front end of the grip.

From the foregoing description of the construction of my improved device, the operation thereof and the method of applying the same for use, will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention, what is claimed is:

1. In a fishing rod, a forehand grip having a portion formed with a depending extension along its under portion, said grip having a rounded upper edge portion and downwardly converging side faces and the depending extension having a rounded under face and concaved side faces merging into the side faces of the grip and the rounded under edge face of the extension, said extension terminating in spaced relation to ends of the grip and having a shoulder at its front end for engagement by the index finger of a hand grasping the grip.

2. In a fishing rod, a forehand grip having a body and front and rear necks projecting therefrom, said body having a depending extension along its under portion of less length than the body to provide front and rear shoulders, the body and extension being of transverse sectional outline adapting the grip to conform to the hand of a person holding the grip with a thumb and fingers engaged about the body and extension and a forefinger engaged across the front shoulder of the extension.

3. In a fishing rod, a forehand grip having a body and rod and reel seat engaging portions at ends thereof, said body having substantially flat sides and rounded upper and lower portions to conform the body to the contour of a hand holding the grip and cause the grip to be firmly held against turning in the hand when held with light gripping pressure.

4. In a fishing rod, a forehand grip having a body and front and rear necks integral therewith, said grip being bored longitudinally to receive a rod, the rear neck being reduced externally from its rear end for the major portion of its length to provide a circumferentially extending shoulder spaced rearwardly from the front end of the rear neck, and a circumferentially extending rib at the front end of the rear neck, said body being shaped to substantially conform to the internal outline of a hand grasping the grip.

JAMES FARLEY MAXWELL.